United States Patent [19]
Brendel

[11] 4,023,404
[45] May 17, 1977

[54] FORCE MEASURING APPARATUS

[75] Inventor: Albert E. Brendel, Lake Orion, Mich.

[73] Assignee: Lebow Associates, Inc., Troy, Mich.

[22] Filed: May 7, 1976

[21] Appl. No.: 684,222

[52] U.S. Cl. .............................. 73/133 R; 73/146
[51] Int. Cl.$^2$ ........................................ G01L 5/16
[58] Field of Search .......... 73/133 R, 146; 308/2 A

[56] References Cited
UNITED STATES PATENTS

| | | |
|---|---|---|
| 3,552,199 | 1/1971 | Pugnaire et al. ............. 73/133 R X |
| 3,729,990 | 5/1973 | Oliver ............................. 73/133 R |
| 3,867,838 | 2/1975 | Gerresheim ..................... 73/133 R |

FOREIGN PATENTS OR APPLICATIONS 1,538,992   8/1968   France .............................. 73/133 R Primary Examiner—Charles A. Ruehl

[57] ABSTRACT

A flexure based transducer structure capable of measuring forces along two mutually perpendicular axes without being adversely affected by large extraneous forces or moments. Forces are applied through one annular collar and are transmitted to a central hub by a pair of flexure elements and a pair of strain-gaged sensing beams, such structure being adapted to measure forces along an axis perpendicular to such beams. The hub connects to the hub of a similar structure oriented at right angles to the first structure for the purpose of measuring forces about a second axis. A second annular collar serves as the connection to the force reacting structure.

7 Claims, 6 Drawing Figures

FORCE MEASURING APPARATUS

BACKGROUND OF INVENTION

The present invention was conceived to measure forces occurring at the interface between a vehicle tire and the road, specifically, the vertical force and the force and aft forces parallel to the longitudinal axis of the vehicle. This force measuring environment creates very severe practical problems. The transducer is normally located along the axis of the tire, while the force inputs are at the road surface. Thus, the forces to be measured are in fact applied at a distance from the transducer axis equal to the tire radius, creating very substantial bending moments at the location of the transducer. Additional bending moments, as well as extraneous forces, are created by lateral skid forces parallel to the axis of tire rotation.

Still another practical problem is the size of the transducer structure. The presence of the wheel prevents the transducer from being located directly above the road contacting portion of the tire. Instead, it must be located inboard therefrom, thus creating another moment arm. It is therefore desirable to make the transducer structure as small as possible, so that its inboard displacement can be minimized.

The combination of large extraneous forces and moments and compact construction results in high stress levels and extraneous error signals in the transducer structure. While electrical compensation techniques have been used in the past for correcting the extraneous signals produced by the strain gages, it has been difficult to obtain reasonable signal levels for the forces to be measured while suppressing signals from extraneous forces.

It is therefore the principal object of the present invention to provide a transducer capable of measuring forces along two mutually perpendicular axes, while being insensitive to extraneous forces and moments, strong enough to provide low and safe stress levels, and small in overall size.

DETAILED DESCRIPTION OF THE INVENTION

Figure 1:
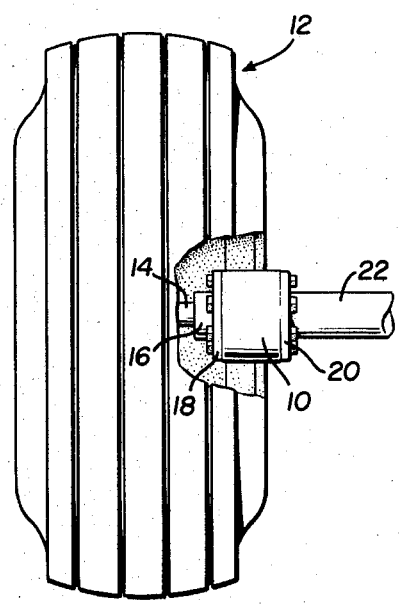
FIG. 1 is a plan view of a force measuring device of the present invention mounted on a vehicle axle.

Referring to FIG. 1, the force measuring device 10 is axially mounted slightly inboard of tire 12. Shaft 14, which is secured to the wheel (not shown) and rotates with the tire, is received in a stationary collar 16 having internal bearings. Force measuring device 10 is mounted between a mounting flange 18 of collar 16 and mounting flange 20 of axle 22. Thus, force measuring device 10 is non-rotatable, a preferable arrangement so that slip rings for the electrical leads to the strain gages can be eliminated.

Figure 2:
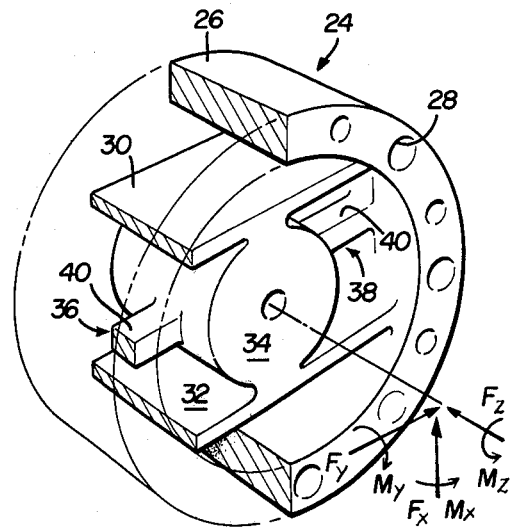
FIG. 2 is a simplified fragmentary perspective view of a portion of the force measuring device of FIG. 1.

The transducer comprises two essentially identical structures, the first of which, structure 24, is illustrated in FIG. 2. Structure 24 comprises a force input collar 26 provided with mounting holes 28 (see FIG. 5) by which the structure is bolted to mounting flange 18. Thus, all of the input forces from the tire are applied to input collar 26.

First structure 24 further comprises a pair of vertically spaced horizontal flexural beams 30, 32 connected at their midpoints to force output hub 34. As shown in FIG. 2, the axis Z is the axis of rotation of the tire and the axis of hub 34. Axis Y is parallel to the fore and aft axis of the vehicle, shown in FIG. 2 as being spaced outwardly along axis Z from structure 24 because of the inboard location of force measuring device 10 from the tire, as shown in FIG. 1. The third mutually perpendicular axis is vertical axis X, also shown located outboard from structure 24 at the intersection of axes Y and Z.

Flexural beams 30 and 32 each define a horizontal plane perpendicular to axis X, and are shaped and dimensioned to be relatively yieldable to forces applied along the X axis, while being very stiff and unyieldable to forces applied in a direction parallel to either the Y or Z axes. They are connected at their outer ends to force input collar 26.

First structure 24 further comprises a pair of sensing beams 36,38, which are axially aligned with each other along an axis parallel to axis Y. They interconnect hub 34 with force input collar 26. Sensing beams 36,38 are proportioned and dimensioned to support a large percentage of forces applied in a direction parallel to the X axis. Upper and lower strain gage-receiving surfaces 40 of sensing beams 36,38 are positioned so that strain gages secured thereto will provide a signal proportional to the bending of beams 36,38 in response to forces applied parallel to the X axis.

Figure 3:
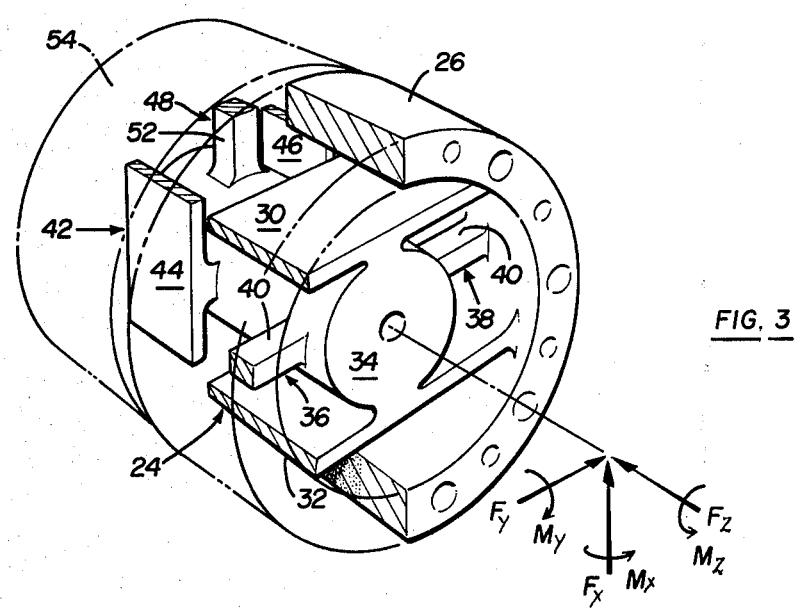
FIG. 3 is a view similar to FIG. 2, but showing an additional portion of the structure.
Figure 4:
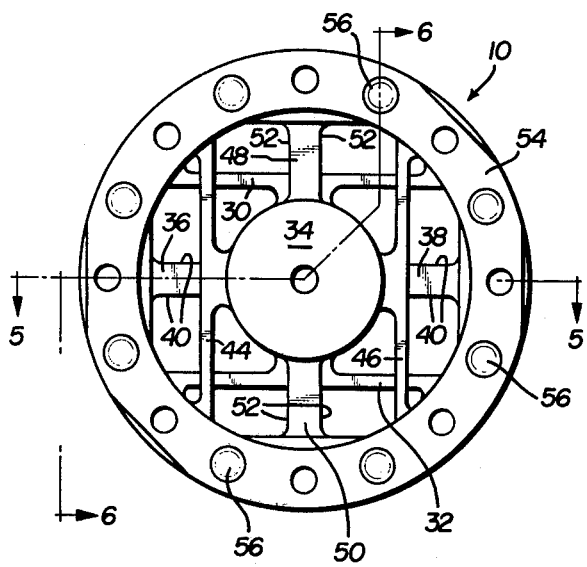
FIG. 4 is an axial view of the force measuring device, viewed in the direction of the axle axis.
Figure 5:
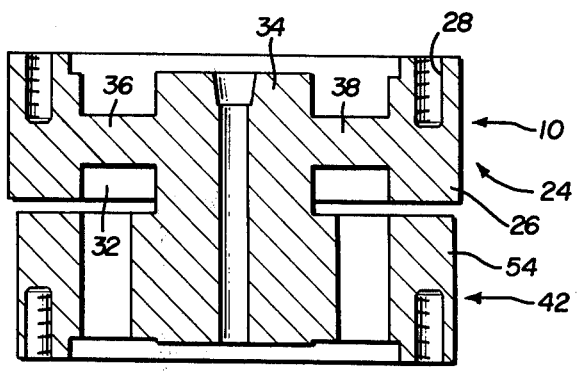
FIG. 5 is a sectional view in the direction of arrows 5—5 of FIG. 4.

As best shown in FIGS. 3 and 5, an extension of force output hub 34 along the Z axis serves as the force input element of second structure 42 which is identical to first structure 24 but rotated 90 degrees relative thereto about axis Z. Thus, a second pair of flexural beams 44,46 are arranged parallel to the X axis, and are connected at their midpoints to the extension of hub 34. A second pair of sensing beam 48,50 are axially aligned with each other parallel to the X axis and are provided with strain gage receiving surfaces 52. Sensing beams 48 interconnect hub 34 with force output collar 54, which collar also is connectd to the outboard ends of flexural beams 44,46.

The flexural beams 44,46 and sensing beams 48,50 are porportioned and dimensioned similarly to their corresponding elements in first structure 24, so that second structure 42 is intended to measure forces along the Y axis by the bending of sensing beams 48,50 and the resulting signal provided by the strain gages mounted on surfaces 52. Thus, beams 44,46 are stiff and unyieldable to forces applied to second structure 42 in the direction of the X and Z axes. Axle 22 serves as the reaction member for forces applied to force measuring device 10, these forces being transmitted through force output collar 54 to mounting flange 20, as shown in FIG. 1.

Insofar as the structure shown in FIG. 3 is concerned, the only interconnection between the first and second structures 24,42, is common hub 34. Collars 26,54 are axially spaced from each other by a gap visible in FIGS.

5 and 6. The entire structure of FIG. 3 is preferably machined out of a single block of metal.

Forces applied to the device along the X axis will be transmitted from input collar 26 through beams 30,32,36 and 38 to hub 34. The tension and compression occurring on the upper and lower strain gage surfaces 40 of beams 36,38 resulting from the bending of such beams will produce an electrical signal proportional to the magnitude of the applied force. This applied force will be further transmitted from hub 34 through beams 44,46,48 and 50 to output collar 54 and from there to mounting flange 20 and axle 22.

Sensing beams 48 and 50 will be loaded as columns in response to an input force along the X axis. The effect of this loading on the strain gages mounted on surfaces 52 will be minimized by the inherent structural attenuation properties of these beams when end loaded as a column. The end loading effects on the sensing beams which would occur in response to simultaneous X and Y forces, cause an additional bending of the beam beyond that produced by the Y axisdirected force which is to be measured in terms of such bending. This errorproducing signal is cancelled out by having the two sensing beams axially aligned, so that the bending moments produced by X axis-directed forces are of opposite sign on the two beams.

Similarly, an applied force on the Y axis is transmitted from input collar 26 to hub 34 by the end loading of beams 30,32,36 and 38. From hub 34, this load is transmitted to output collar 54 by the transverse beam loading of beams 44,46,48 and 50. The bending of beams 48,50 will produce tension and compression on strain gage surfaces 52, and the strain gages mounted thereon will produce a signal porportional to the magnitude of the force applied along the Y axis. The end loading effects on beams 36,38, functioning as columns in this instance, will be cancelled out, as described above, and will therefore produce no extraneous signal from the strain gages mounted thereon. Forces applied along the Z axis are resisted in shear primarily by beams 30,32,44 and 46.

The configuration of this structure effectively isolates the sensing beams from any applied moments. Moments about either the X or Y axis are resisted in shear by the flexural beams, while moments about the Z axis are resisted in either tension or compression by such beams. Thus, extraneous forces are attenuated and channeled around the measuring elements, which can therefore be designed to optimize their performance or response to the loads to be measured, while the other structure elements can be designed to optimize their load carrying function to assure linearity and safety.

Figure 6:
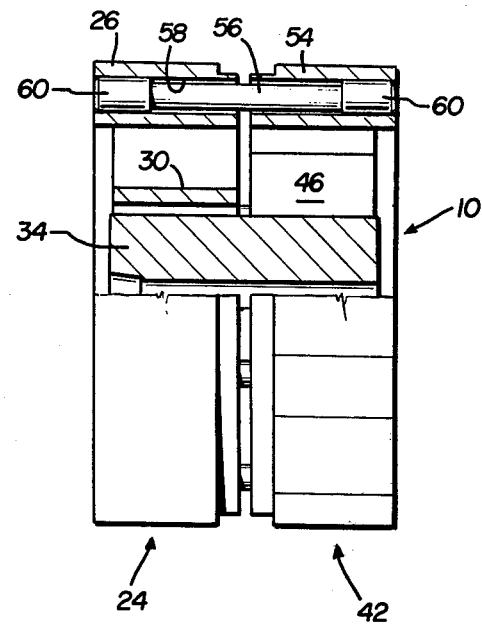
FIG. 6 is a side view of the structure of FIG. 4, partly in section, viewed in the direction of arrows 6—6 of FIG. 4.

Referring now to FIG. 6, a plurality of reinforcing pins 56 are brazed at their ends into holes 58 in collars 26 and 54. Pins 56 have enlarged diameters at their ends 60, so that the intermediate portion of the length of these pins will be free from any contact with the collars even if the collars yield relative to each other under load. Thus, the intermediate portions of the pins, which are relatively weak as beams, do not interfere with any relative flexing which may occur between the two collars, but the relatively high resistance of the pins to axially directed forces permits force measuring device 10 to withstand substantially higher forces along the Z axis and moments about the X and Y axis, thus reducing the stresses in the more vulnerable parts of the structure to safer and more tolerable levels while permitting a compact size to be retained.

To protect the strain gages and electrical connections from environmental hazards, the entire device may be enclosed in an appropriate housing which is designed to avoid upsetting the load transmitting characteristics of the basic structure, as will be understood by those skilled in the art.

While the device disclosed herein is particularly well adapted for measuring tire loads, it may also be applied to other environments where forces along two mutually perpendicular axes are to be measured.

This invention may be further developed within the scope of the following claims. Accordingly, the above specification is to be interpreted as illustrative of only a single operative embodiment of this invention, rather than in a strictly limited sense.

I now claim:
1. A device for measuring forces comprising:
   1. a first structure adapted for measuring forces applied along a first axis and a second structure adapted to measure forces along a second axis perpendicular to said first axis, said first and second structures being connected to each other and spaced along the third mutually perpendicular axis;
   2. said first structure comprising:
      a. a first pair of parallel flexural beams extending in a direction parallel to said second axis and spaced apart along said first axis, the cross-section of said beams being proportioned to be resiliently yieldable to a relatively large degree to forces applied along said first axis while being substantially unyieldable to forces applied along said third axis;
      b. a first rigid hub located between said first pair of beams and rigidly connected thereto at a point intermediate their ends, said hub functioning as the force output member of said first structure;
      c. a first pair of sensing beams axially aligned with each other parallel to said second axis and between said first pair of flexural beams, said sensing beams being rigidly connected at their axially inner ends to said hub and extending in opposite directions therefrom;
      d. a rigid force input member rigidly connected to the ends of said flexural beams and to the axially outer ends of said sensing beams;
      e. said sensing beams being constructed and proportioned to be less yieldable than said flexural beams to forces applied along said first axis;
   3. said second structure comprising:
      a. a second rigid hub rigidly connected to said first hub, said second hub serving as a force input member for said second structure;
      b. a second pair of parallel flexural beams extending in a direction parallel to said first axis and spaced apart on opposite sides of said second hub in a direction parallel to said second axis, said beams being rigidly connected to said second hub at a point intermediate their ends, the cross-section of said beams being proportioned to be resiliently yieldable to a relatively large degree to forces applied along said axis while being substantially unyieldable to forces applied along said third axis;
      c. a second pair of sensing beams axially aligned with each other parallel to said first axis and located between said second pair of flexural beams, said sensing beams being rigidly connected at their axially inner ends to said second hub and extending in opposite directions therefrom, said sensing beams being constructed and proportioned to be less yieldable than said second pair of flexural beams to forces applied in a direction parallel to said second axis;

d. a second rigid force output member rigidly connected to the ends of said second pair of flexural beams and to the axially outer ends of said sensing beams;

4. whereby, when force transducer means responsive to the resilient yielding of said sensing beams are secured thereto, said transducer means associated with said first pair of sensing beams will provide a signal proportional to the magnitude of forces applied to said first force input member along an axis parallel to said first axis, and said transducer means associated with said second pair of sensing beams will provide a signal proportional to the magnitude of forces applied to said first force input member along an axis parallel to said first axis.

2. The force measuring of claim 1 wherein said force input member of said first structure and said force output member of said second structure are each of annular shape with respect to said third axis.

3. The force measuring device of claim 1 wherein said first and second hubs are constructed as one continuous hub extending along said third axis.

4. The force measuring device of claim 1 wherein said force input member of said first structure and said force output member of said second structure are directly interconnected by reinforcing means which are so proportional and arranged as to have substantial rigidity to forces parallel to said third axis, while being relatively yieldable to forces parallel to said first and second axes, whereby said first and second pair of sensing beams are the principal force resisting members for forces applied parallel to said first and second axes, respectively.

5. The force measuring device of claim 4 wherein said reinforcing means comprise a series of thin rods extending parallel to said third axis, and connected at their ends to said force input member of said first structure and said force output member of said second structure.

6. The force measuring device of claim 1 wherein all of said first and second structure are formed from a single integral piece of metal.

7. A device for measuring forces comprising:

1. a first structure adapted for measuring forces applied along a first axis and a second structure adapted to measure forces along a second axis perpendicular to said first axis, said first and second structures being connected to each other and spaced along the third mutually perpendicular axis;

2. said first structure comprising:

a. a first pair of parallel flexural beams extending in a direction parallel to said second axis and spaced apart along said first axis, the cross-section of said beams being proportioned to be resiliently yieldable to a relatively large degree to forces applied along said first axis while being substantially unyieldable to forces applied along said third axis;

b. a first rigid hub located between said first pair of beams and rigidly connected thereto at a point intermediate their ends, said hub functioning as the force output member of said first structure;

c. a first pair of sensing beams axially aligned with each other parallel to said second axis and between said first pair of flexural beams, said sensing beams being rigidly connected at their axially inner ends to said hub and extending in opposite directions therefrom;

d. a rigid generally annular force input member rigidly connected to the ends of said flexural beams and to the axially outer ends of said sensing beams and surrounding said first structure;

e. said sensing beams being constructed and proportioned to be less yieldable than said flexural beams to forces applied along said first axis;

3. said second structure comprising:

a. a second rigid hub rigidly connected to said first hub and forming an extension thereof along said third axis, said second hub serving as a force input member for said second structure;

b. a second pair of parallel flexural beams extending in a direction parallel to said first axis and spaced apart on opposite sides of said second hub in a direction parallel to said second axis, said beams being rigidly connected to said second hub at a point intermediate their ends, the cross-section of said beams being proportioned to be resiliently yieldable to a relatively large degree to forces applied along said second axis while being substantially unyieldable to forces applied along said third axis;

c. a second pair of sensing beams axially aligned with each other parallel to said first axis and located between said second pair of flexural beams, said sensing beams being rigidly connected at their axially inner ends to said second hub and extending in opposite directions therefrom, said sensing beams being constructed and proportioned to be less yieldable than said second pair of flexural beams to forces applied in a direction parallel to said second axis;

d. a second generally annular rigid force output member rigidly connected to the ends of said second pair of flexural beams and to the axially outer ends of said sensing beams and surrounding said first structure;

4. whereby, when force transducer means responsive to the resilient yielding of said sensing beams are secured thereto, said transducer means associated with said first pair of sensing beams will provide a signal proportional to the magnitude of forces applied to said first force input member along an axis parallel to said first axis, and said tranducer means associated with said second pair of sensing beams will provide a signal proportional to the magnitude of forces applied to said first force input member along an axis parallel to said second axis.

* * * * *